United States Patent

Gilliland et al.

[11] 4,229,790
[45] Oct. 21, 1980

[54] CONCURRENT TASK AND INSTRUCTION PROCESSOR AND METHOD

[75] Inventors: Maxwell C. Gilliland; Burton J. Smith, both of Denver; Gary L. Ferguson, Boulder, all of Colo.

[73] Assignee: Denelcor, Inc., Denver, Colo.

[21] Appl. No.: 951,548

[22] Filed: Oct. 16, 1978

[51] Int. Cl.² ............................................. G06F 9/18
[52] U.S. Cl. ................................................. 364/200
[58] Field of Search ........................ 364/200 MS File

[56] References Cited

U.S. PATENT DOCUMENTS

| | | | |
|---|---|---|---|
| 3,728,692 | 4/1973 | Fennel, Jr. .......................... | 364/200 |
| 3,787,673 | 1/1974 | Watson et al. .................... | 364/200 X |

*Primary Examiner*—David H. Malzahn
*Attorney, Agent, or Firm*—O'Rourke & Harris

[57] ABSTRACT

A processor and method for concurrent processing of tasks and instructions are disclosed. The processor is basically a multiple instruction, multiple data stream (MIMD) digital computer that utilizes pipelining for control and function units, but avoids precedence constraint penalties. Task and instruction processing is carried on concurrently through the use of a snapshot taken of the next process status words (PSWs) to be serviced for each active task, the pointers for which are stored in task first in-first out buffers (task FIFOs). The PSWs, along with their parent task status words (TSWs), are placed into the control pipeline one at a time and serviced, after which each PSW pointer is placed back in the task FIFO from where it was taken. After all process status words of the snapshot have been entered into the control pipeline, a new snapshot is taken and the PSWs processed in the same manner. Instruction execution is carried out as the TSW/PSW pair proceeds through the control pipeline, during which time the required data operations are carried out by pulling operands from a memory unit, as required for execution of that particular instruction, and causing the same to be sent to the function units after which the results are placed in the memory unit. For interprocess data transfers, synchronization is accomplished through use of hardware implemented semaphores called a scoreboard. In addition, passage of data between processors and memories other than those associated, or local, memories, is through a memory switch.

46 Claims, 16 Drawing Figures

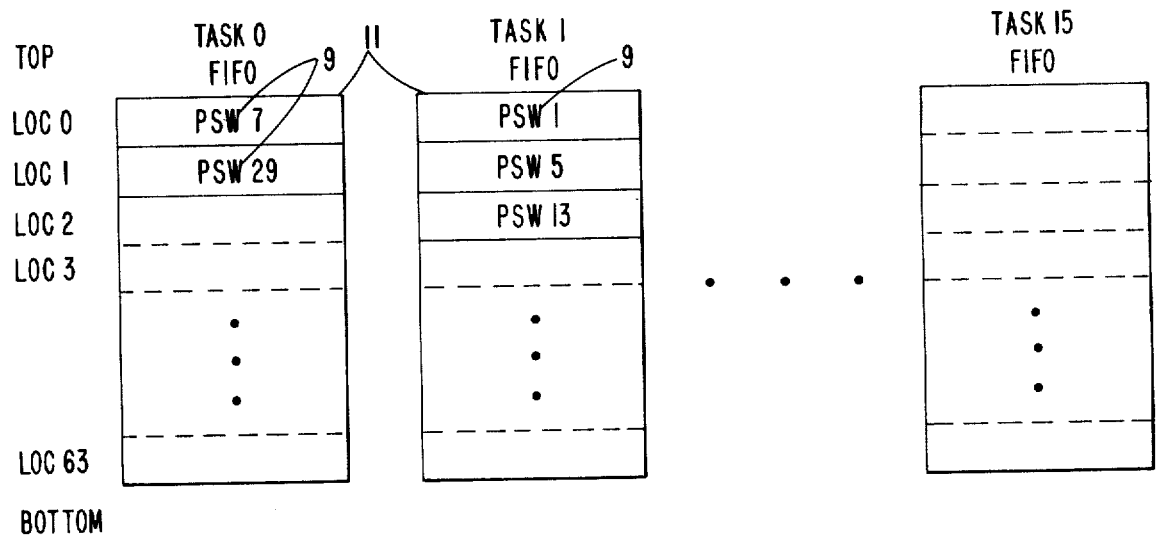
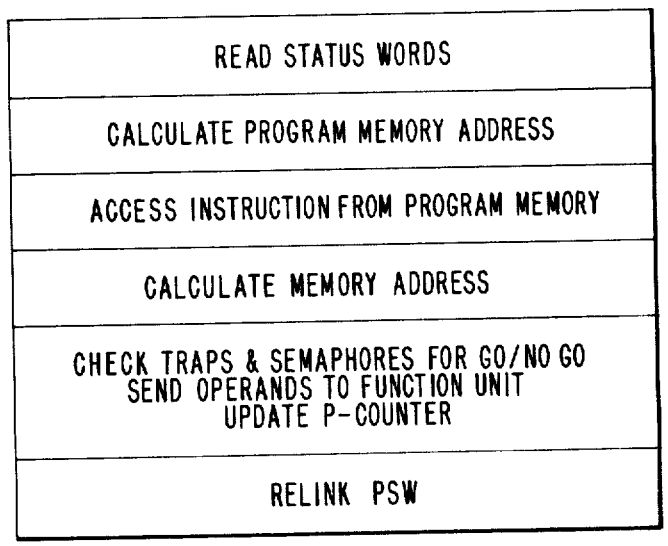

CONCURRENT TASK AND INSTRUCTION PROCESSOR AND METHOD

FIELD OF THE INVENTION

This invention relates to data processing, and, more particularly, relates to concurrent task and instruction processing in a multiple instruction, multiple data stream computer.

BACKGROUND OF THE INVENTION

In early computers, programs were executed in a digital computer one at a time and each program had to be completed before a new one could be started. The computer, under control of the program, would read its input, compute, and then generate outputs. This obviously was an inefficient usage of computer resources since, while the input and output operations were being performed, the central processing unit (CPU) was not computing and, conversely, while the central processing unit was computing, the input/output capabilities of the computer were idle.

This led to development of independent peripheral device controllers, or peripheral processors, for handling input/output operations independently from the central processing unit. With the use of such devices, one program could be causing an input operation to be executed while a second program was causing computing, and a third program causing output to be generated. An example of peripheral processing is shown, for example, in "Design Of a Computer The Control Data 6600" by J. E. Thornton, Scott, Foresman & Company (1970), pages 141-154.

As technology evolved and computers became faster, the utilization of other resources became the limiting factor. These resources included the adder, multiplier, and other function units which make up the central processing unit. Program instructions could be fetched, or pulled, from the memory unit much faster than the function units (such as an adder, etc.) could execute them.

This then led to development of various techniques and/or systems for increasing the utilization of the function units. Of these various techniques and/or systems, one of the more useful is known as pipelining. The basic idea of pipelining is to provide a set of registers which hold data with the registers being connected with pipe inputs and outputs. A new data word is placed in the pipe each clock time. After a certain number of clock times (for example, six), the data word moves through the pipe and comes out of the other end.

This technique has been heretofore employed to speed up function units, such as an adder. If, for example, an adder requires 600 ns to add two numbers, then, once an addition is started, the adder cannot be used to add a new set of numbers until it has completed the current addition. Thus, its time rate of doing work is 600 ns/addition. If registers are placed at strategic locations inside the adder to catch intermediate results, this is pipelining. A second pair of numbers can now be fed to the adder as soon as the intermediate result of the first pair is stored in the first register. For example, if six registers are used, the input/output time rate of the adder is 100 ns/addition even though each addition still requires 600 ns.

The principal difficulty heretofore encountered with pipelining is what is called the precedence problem. This problem, although quite complex, can be illustrated with a simple example. Suppose the first instruction in a program adds 1 to a variable A, and the second instruction adds the result to B. It is evident that the execution of the second instruction cannot be started until completion of the first. Because the second instruction follows immediately after the first, pipelining of the adder does nothing to increase the execution speed. The addition of A and 1 must move all the way through the adder pipe before the second addition can be started.

Another technique heretofore developed for speeding up central processing unit execution is overlap. Overlap is an attempt to execute several instructions within a program simultaneously. For example, if an add instruction is followed by multiply instruction, then the central processing unit will try to execute both simultaneously. Although overlap leads to an increase of execution speed, it still is limited in applicability by the precedence problem.

A recent and well publicized technique which purports to solve the precedence problem is the use of array processing. An array processor executes instructions which specify whole vectors of operands which are to be operated upon by pipelined function units. This technique, however, is applicable only to a certain class of problems (namely those which are vector-oriented), and is not particularly effective for most applications.

The simplest type of processor discussed hereinbefore is called a single instruction, single data stream (SISD) processor, i.e., a processor wherein the central processing unit performs one instruction at a time on a single job (data stream). Other types of processors have also been heretofore suggested and/or developed. A processor which performs a single instruction on several data streams simultaneously is called a single instruction, multiple data stream (SIMD) processor, while a processor which performs multiple instructions on multiple data streams is called a multiple instruction, multiple data stream (MIMD) processor. Such processors are discussed, for example, in "Some Computer Organizations And Their Effectiveness" by Michael J. Flynn, IEEE Transactions on Computers, Vol. C-21, No. 9, September, 1972.

A data flow processor has also been heretofore suggested for parallel processing whenever sections of the processor are connected by interconnection networks. Such a processor is shown, for example, in "Performance Analysis of a Data-Flow Processor", by David P. Misunas in proceedings of the 1976 International Conference on Parallel Processing (1976), pages 100-105, along with the references cited therein.

In a multiple instruction, multiple data stream (MIMD) processor, several data streams are processed simultaneously and independently by instructions which are also independent (in contrast with a SIMD processor). This type of processor can be implemented either with separate central processing units, one for each data stream, or by the use of one central processing unit which is, in effect, multiplexed among the several data streams.

The main problem with the use of separate control processing units is that the cost is sizable and each of them is still subject to the precedence problem, as are all SISD processors. A practical approach to the implementation of the MIMD processor is therefore to use a central processing unit which is multiplexed among the several data streams in a way that it does not suffer from precedence constraints.

SUMMARY OF THE INVENTION

This invention provides an instruction processor and preferably a concurrent task and instruction processor, that is suitable for use as an MIMD processor, and a process for concurrent task and instruction processing. The processor is a digital computer and the processor and method enable processing of different and independent jobs concurrently through the use of pipelining with precedence constraints being avoided through the use of access regulation, and protection and relocation being afforded.

It is therefore an object of this invention to provide a novel instruction processor and method.

It is another object of this invention to provide a novel concurrent task and instruction processor and method.

It is another object of this invention to provide an improved digital computer.

It is still another object of this invention to provide an improved multiple instruction, multiple data stream processor.

It is yet another object of this invention to provide an improved processor that includes pipelining of control and function units.

It is still another object of this invention to provide an improved processor and method capable of handling programs without processor degradations caused by precedence constraints.

It is yet another object of this invention to provide an improved processor and method that affords protection and relocation.

It is still another object of this invention to provide an improved processor and method that includes access regulation.

It is still another object of this invention to provide an improved processor that includes novel memory switching.

It is still another object of this invention to provide a novel access regulating unit suitable for use with a word processor.

It is still another object of this invention to provide a novel memory switch suitable for use with a word processor.

It is still another object of this invention to provide a concurrent task and instruction processor which utilizes data sychronization among the several process streams comprising a task.

It is still another object of this invention to provide a novel task handling unit in which multiprogramming is implemented with hardware rather than software.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 illustrates in block form a plurality of task FIFOs utilized in this invention;

FIG. 3 is a flow diagram illustrating the control (instruction) pipeline;

DESCRIPTION OF THE INVENTION

The processor of this invention concurrently processes tasks and instructions. Each task is controlled by a task status word (TSW) and each task can include a plurality of process status words (PSWs) associated with that task.

A program status word is required for the execution of a program in a single instruction stream computer. It contains information such as the program count (which is the relative address of the next program instruction in memory), and base and index values for the calculation of the absolute addresses of instructions, operands, and like, in memory. The execution of a sequence of arithmetic operations on a data stream is called a process.

In a single instruction, multiple data stream (SIMD) processor, because of its single instruction stream architecture, there is only one process state and it requires a program status word. In a multiple instruction, multiple data stream (MIMD) processor, there are as many process states as there are data streams because the processing of each data stream can be independent of the others. So, in effect, there are multiple program status words. It is more definitive to call the word controlling the execution of program for each data stream, the process status word (PSW). Each central processing unit (CPU) in the processor of this invention can process up to 128 parallel process states. It does this on a "round-robin" basis for all active processes, which amounts to concurrent instruction processing.

Processes can be parallel parts of the same task (job). If several tasks are to be processed concurrently, then the PSWs for each task must be distinguished from those for others as regards task memory allocation. The task memory allocation is contained in the task status word (TSW). The PSWs which are associated with parallel parts of the same task contain a task identifier which specifies the task number. There are both user and supervisor tasks, the latter being used by the operating system.

The active PSWs in the system are grouped according to the tasks which they support, and this is accomplished by placing the PSW pointers (generally designated 9) for each task in a first-in-first-out buffer (FIFO) as indicated in FIG. 1 by the general designation 11. The entries in the FIFOs are actually address locations of the PSWs in the PSW memory. Each central processing unit (CPU) in the processor of this invention can process up to 16 tasks on a "round-robin" basis, which amounts to concurrent task processing. Thus, the CPU processes tasks concurrently, as well as processing the parallel parts of each task concurrently.

Figure 2:
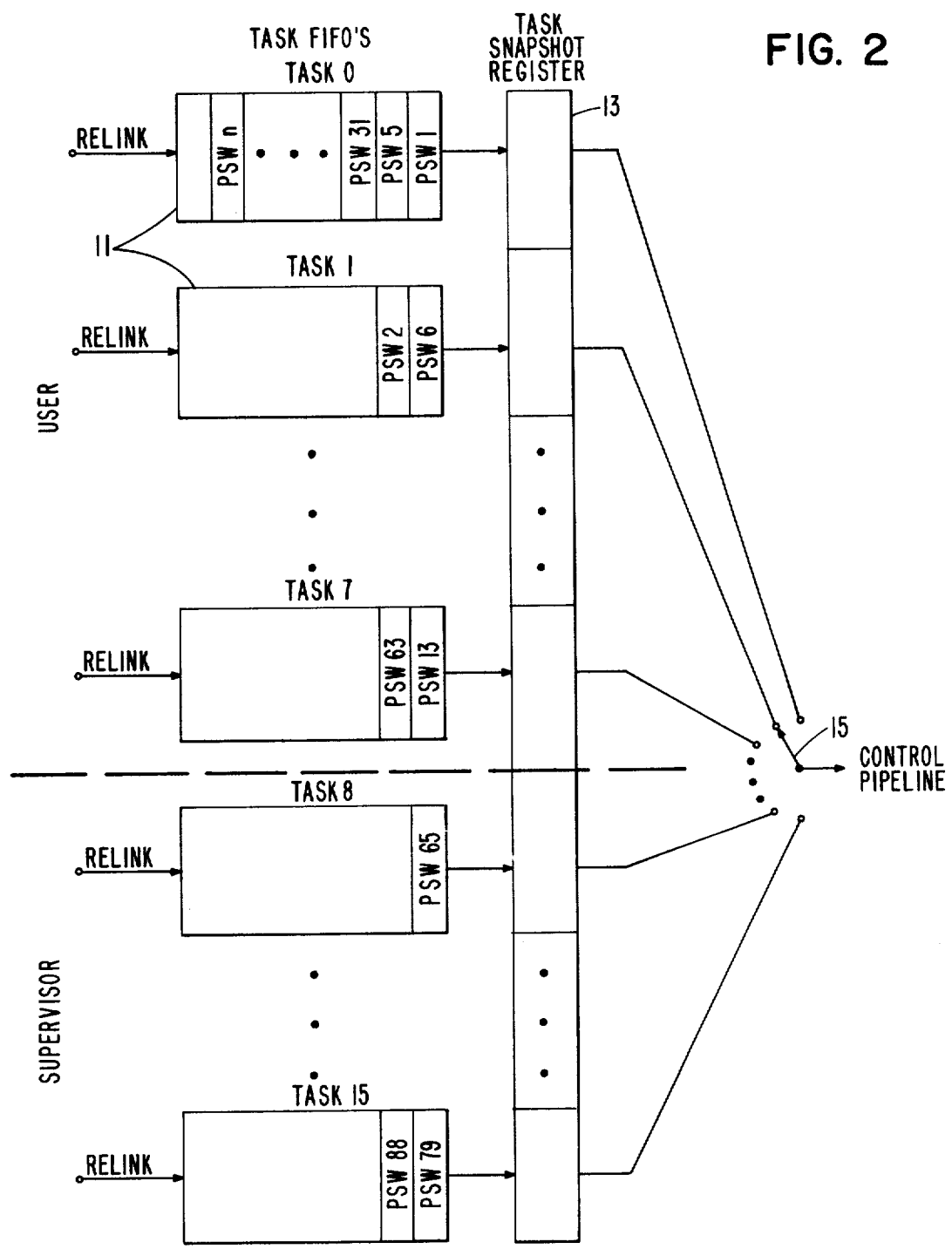
FIG. 2 is a block diagram illustrating, in simplified form, connection of the task FIFOs with the task snapshot register.

The concurrent task and instruction processing of the CPU is implemented with a snapshot, as indicated in FIG. 2, taken at task snapshot register 13. A snapshot is taken of the next PSW to be serviced for each active task (a task is inactive if there are no active PSWs associated with the task, that is, its FIFO is empty.) These PSWs each together with a copy of its parent TSW, are put into the control pipeline, and each is relinked by placing its pointer 9 back in the proper task FIFO 11. When all the PSWs in the snapshot have been put into the control pipeline, a new snapshot is taken. The procedure described provides not only concurrent processing of tasks but also concurrent processing of the parallel parts of each task.

Figure 4A:
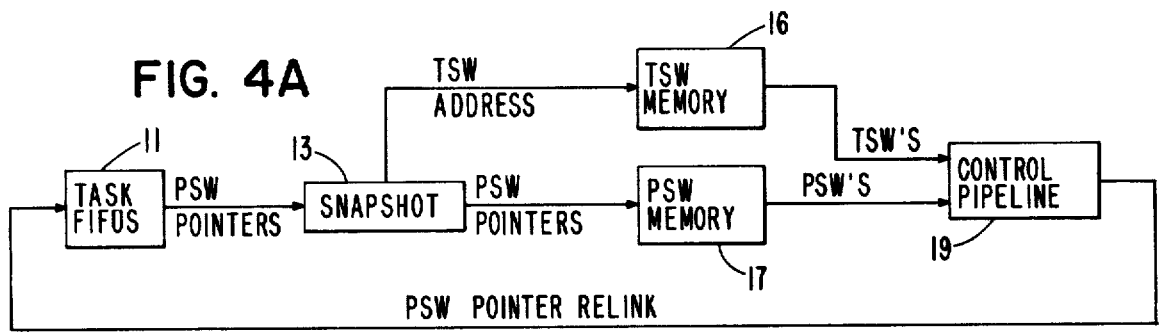
FIGS. 4(a) and 4(b) are flow diagrams illustrating the instruction and data loops.

Instruction execution is carried out as the TSW/PSW pair proceeds through the control (instruction) pipeline as indicated in the flow diagram of FIG. 3. The complete cycle, including the snapshot, accessing the TSW and PSW memories 16 and 17, respectively, putting the TSW/PSW pairs into the control pipeline 19, and relinking the PSW pointer, is called the instruction loop and this is shown in the instruction loop flow diagram of FIG. 4A.

Figure 4B:
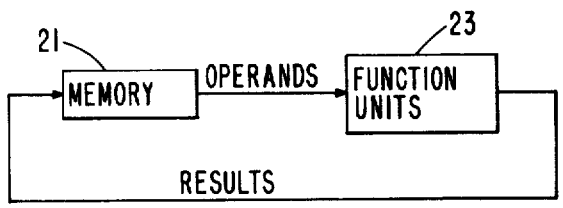

Instruction execution generally requires reading operands from memory 21, sending the operands to appropriate function units 23 (e.g. adder, multiplier, etc.), and writing the results generated by the function units back into the memory. This is called the data loop and is shown by the general flow diagram of FIG. 4B.

For most instructions, the operations of the instruction loop and data loop are synchronized. That is, the time required for a single PSW to traverse the instruction loop is the same as the time required for execution of the instruction it specifies (data loop). Such instructions are called synchronous. Instructions can also be asynchronous in the sense that instruction execution (data loop) cannot be completed during the instruction loop. Instructions of this type are called asynchronous.

All the function units in the CPU are pipelined. Synchronous instructions are never delayed by the interaction of precedence constraints and pipelined function units, because by the time the PSW pointer is relinked, the result from the function unit has been written in the memory. The processing speed of the CPU is not degraded because a new TSW/PSW pair is put into the control pipeline at each machine cycle. In other words, the CPU does other work while waiting for any one PSW to be processed.

Figure 5:
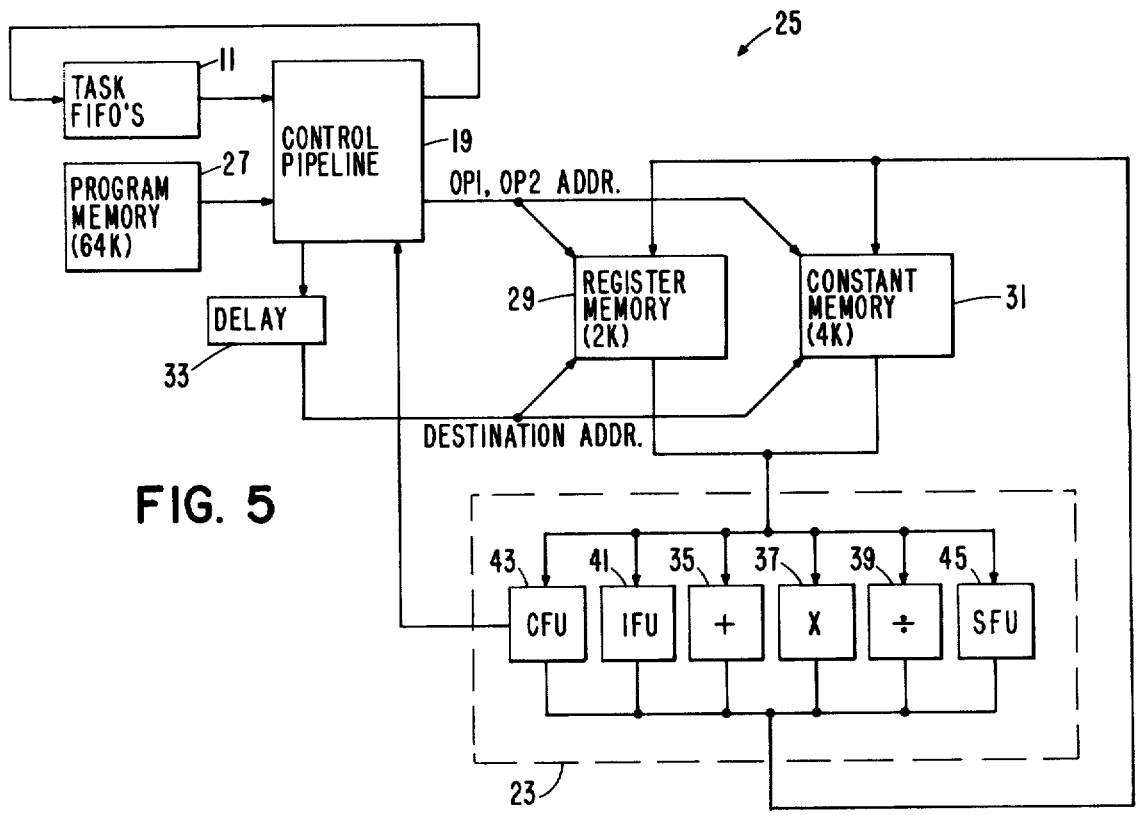
FIG. 5 is a block diagram showing the processor of this invention.

The basic processor 25 of this invention is shown in FIG. 5. The PSWs circulate through the control pipeline 19 from the task FIFO buffers 11, and are then relinked, after which the pointers 9 are reinserted in the task FIFO buffers 11 (instruction loop). Each PSW together with a copy of the status word is used to generate a program memory address 27. The instruction access from program memory 27 is combined with other information from the PSW and TSW to generate register, memory, constant memory, or data memory addresses as well as specify the type of acts (function unit) to be taken for the instruction.

Control pipeline 19 is connected with register memory 29 and constant memory 31 with the destination address output being through delay 33. Most instructions are of the three address type. Two operands are read from either the register memory (2K) 29 or the constant memory (4K) 31 and sent to the appropriate function unit from where the result is written in the destination address.

The constant memory 31 is, effectively, a read-only memory (ROM) and is used to store run-time constants or a limited amount of arbitrary function data. The constant memory 31 is used to store constants required by processes at run time (e.g., a math library for example). It can be viewed as a hardware literal pool. A program instruction can access the contents of the location in the constant memory for either of the operands (instead of the contents of the location in the register memory).

The floating-point function units 23 may include the adder/subtractor 35, multiplier 37 and divider 39. The integer function unit (IFU) 41 implements fixed-point add/substract and all other instructions such as shifting, masking, etc. A create function unit (CFU) 43 is used to create new processes by placing new PSWs in the unit. It also interacts with the control pipeline 19 to relink PSWs. A scheduler function unit (SFU) 45 is used to access data memory.

The processor machine language contains a CREATE instruction. This is used to generate (create) a subroutine which can be executed concurrently with the calling routine (sometime called a co-routing). The create function (CFU) unit 43 is used to generate the process status word used for this purpose and place it in the unit. The quit instruction is used by a routine to terminate itself.

Figure 6:
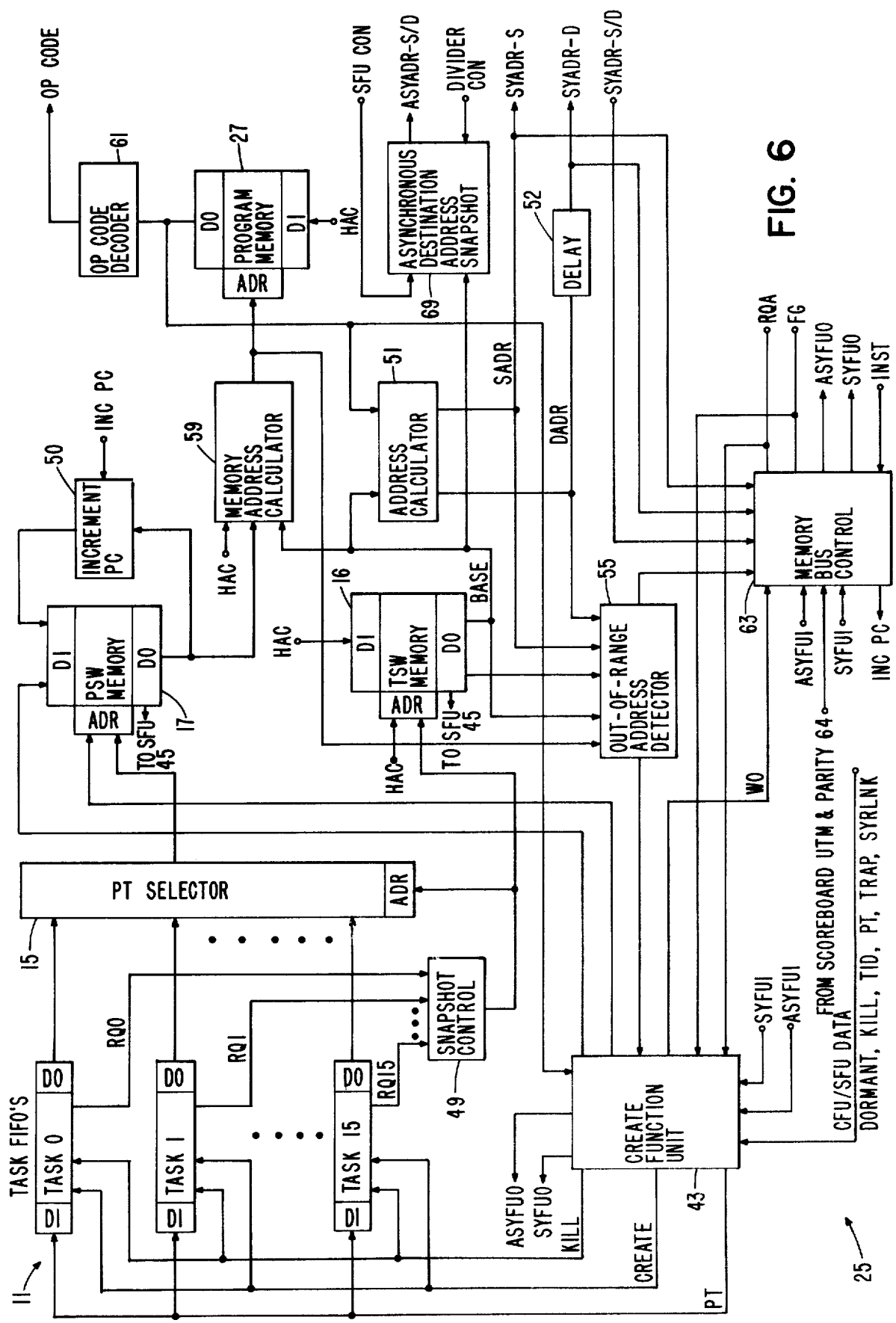
FIGS. 6 and 7, taken together, constitute an expanded block diagram showing the processor of this invention.
Figure 7:
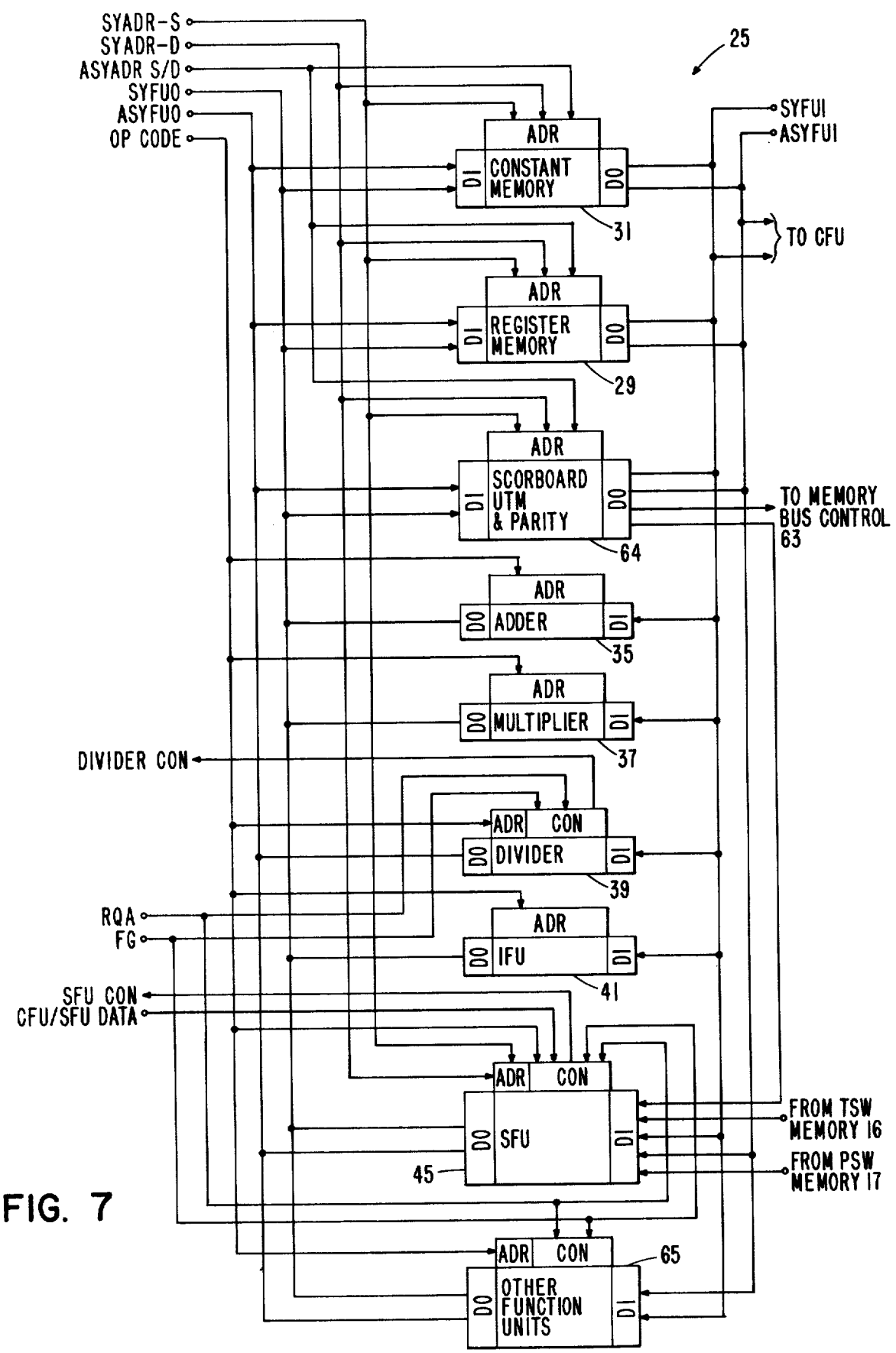

Processor 25 is shown in greater detail in FIGS. 6 and 7. The legends used on these FIGURES are set forth in Table I hereinafter.

TABLE I

| LABEL | DEFINITION |
|-------|------------|
| ADR | ADDRESS |
| ASY | ASYNCHRONOUS |
| CON | CONTROL |
| CRE | CREATE |
| D | DESTINATION |
| DI | DATA IN |
| DO | DATA OUT |
| FG | FUNCTION GRANT |
| FUI | FUNCTION UNIT INPUT BUS |
| FUO | FUNCTION UNIT OUTPUT BUS |
| HAC | HARDWARE ACCESS CONTROL |
| INST | INSTRUCTION |
| LNK | LINK |
| PC | PROGRAM COUNTER |
| PSW | PROCESS STATUS WORD |
| PT | PSW POINTED |
| RLNK | RELINK |
| RQ | REQUEST |
| RQA | REQUEST ACKNOWLEDGE |
| S | SOURCE |
| SY | SYNCHRONOUS |
| TID | TASK NUMBER |
| TSW | TASK STATUS WORD |
| UTM | USER TRAP MASK |

| TABLE I-continued | |
|---|---|
| LABEL | DEFINITION |
| WO | WAVE OFF |

As indicated, there are 16 task FIFO's (first-in, first-out buffers) 11 containing pointers to the PSWs associated with the tasks. If a task FIFO is empty, the task is inactive. A snapshot is made of all active tasks (those requesting service). The snapshot requests are serviced sequentially starting with the lowest task number using snapshot control circuitry 49. After all requests have been serviced, a new snapshot is taken. If there is only one active task, a new snapshot will be made at each machine cycle.

Servicing a request means generating address pointers for the TSW and PSW memories 16 and 17 (PSW memory 17 has an increment PC 50 in parallel therewith). The PSW and TSW pointed to are accessed from those memories and used by the address calculators 51 and 59 to generate program memory address as well as the address of source and destination operands (the destination address output being coupled through delay 52). The addresses generated are checked against the base and length definition for the task by the out-of-range address detector 55. If any of the addresses are out-of-range, notification is sent to the CFU which in turn suspends the task and inhibits the synchronous or asynchronous bus transfer to the function unit designated by the associated instruction from program memory 27.

TSW memory 16 can be accessed by the operating system through the hardware access control. PSW memory can be accessed either the same way or by the CFU. The latter occurs if a program instruction or other action creates a new PSW. When a new PSW is generated by the CFU, its pointer is also put in the corresponding task FIFO. The CFU can relink an existing PSW which has been serviced or kill (eliminate) a PSW when it is no longer needed.

The memory address calculator 59 calculates the address of the instruction to be executed. The instruction is accessed from the program memory 27. There are offset, base and index fields in the instruction which are used (together with the base from the TSW) for calculating actual operand source and destination addresses. The op code field of the instruction specifies which function unit is to process the operands. This field is decoded by the op code decoder 61 which addresses the appropriate function unit. Some instructions will cause the creation of a new PSW. In this case, the required part of the instruction field is sent to the CFU. The program memory also can be accessed by the hardware access control.

When a task is represented in terms of parallel parts (several process states), interprocess data transfers generally are required. These data transfers must be synchronized because a receiving process cannot read data from a common (interprocess) memory location until they have been generated by the sending process, or the sending process cannot write new data in the common memory location until the previous data have been read by the receiving process. Synchronization of interprocess data transfers is accomplished with a set of hardware implemented semaphores called a scoreboard. The CPU regulates the access of a memory location, holding instructions for later execution whenever a particular location is not ready for the data transaction to occur.

Figure 8:
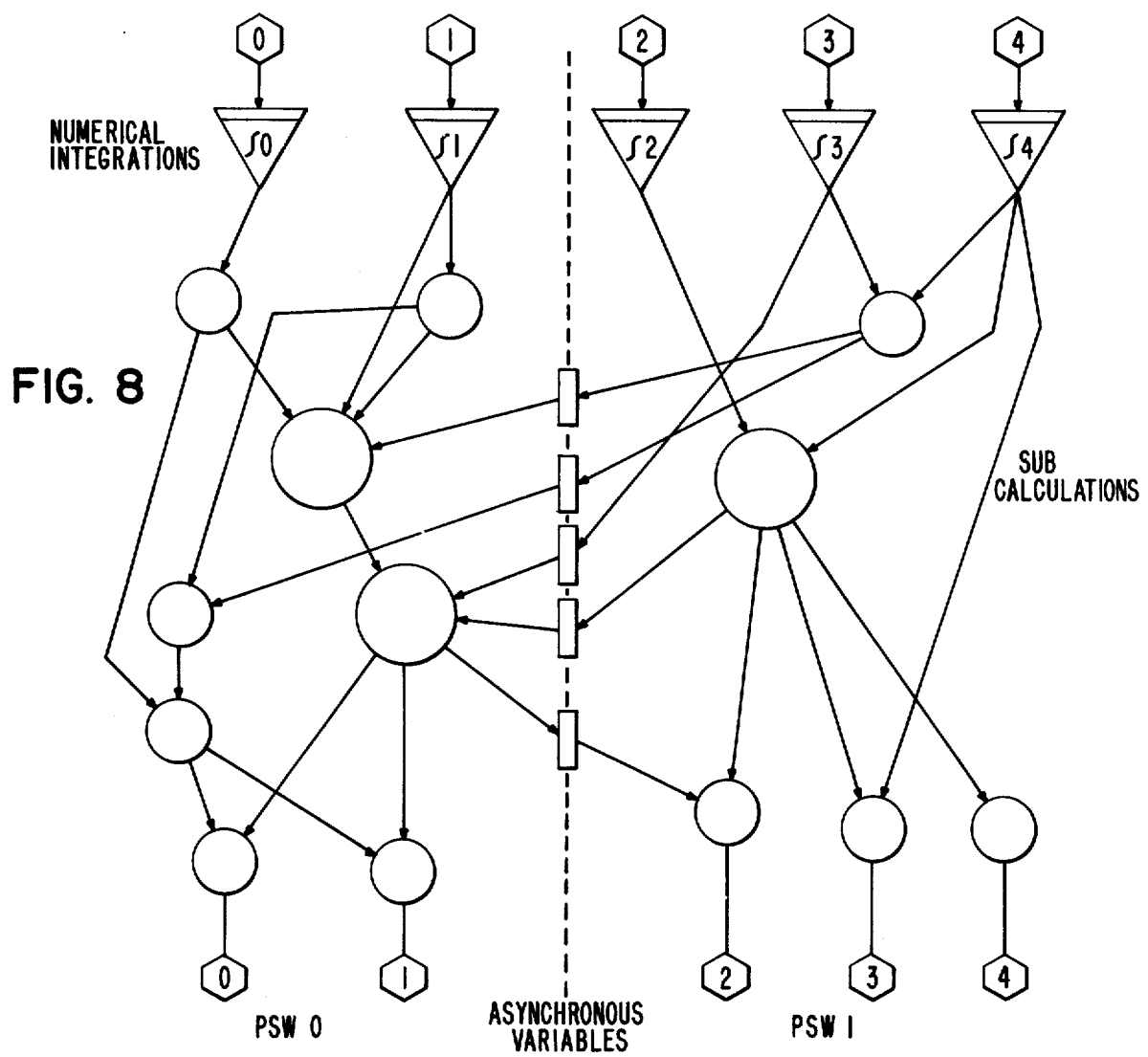
FIG. 8 is a flow chart illustrating interconnection of process streams using asynchronous variables.

Many computer simulation applications exhibit parallelism. A typical example of a flow graph is shown in FIG. 8, and to illustrate how parallelism can be exploited, a dotted line has been drawn through the graph which divides it into two parallel parts with numerical integrations (depicted by triangles) and subcalculations (depicted by circles) in each part. A flow graph for a practical, large, problem can be decomposed into many parallel parts. The way the processor is used to solve problems of this kind, is to perform the calculations for each parallel part of the graph with a separate process stream (using a separate PSW). Both of the process streams are under the control of the same task (TSW). This procedure generates interprocess data transfers (shown at the asynchronous variables depicted as rectangles in FIG. 8). These data transfers are made through specific memory locations. The variable labels for these data are called asynchronous as opposed to variable labels which are internal (to a data stream) to a process (synchronous).

Figure 9:
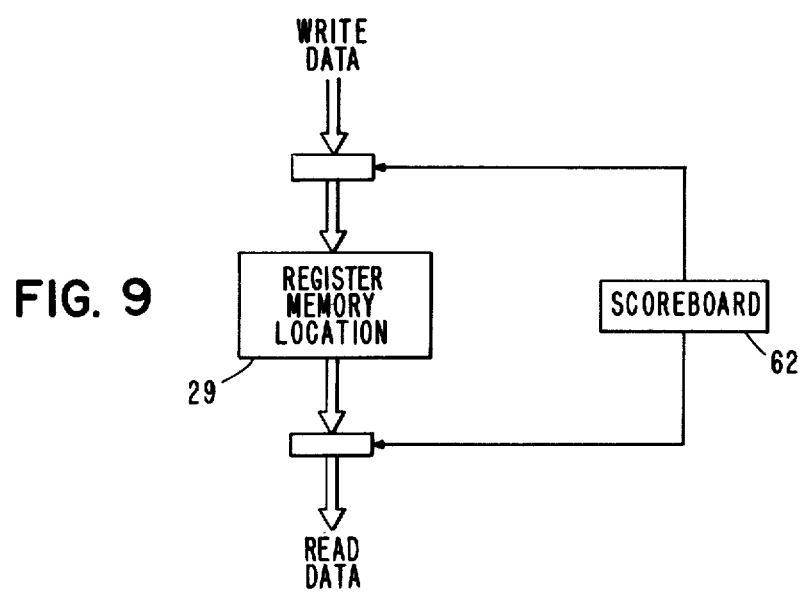
FIG. 9 is a block diagram illustrating utilization of a scoreboard in regulating access to a register or data memory location.

If the computer simulation is to be meaningful, data transfers of asynchronous variables through these (asynchronous) locations must be regulated in a sense that a process stream must not read data from these locations before they are full and furthermore must not write data in them until they are empty. The necessary regulation is imposed with an access regulating unit, or scoreboard 62. FIG. 9 shows generally how the scoreboard regulates the access of a register memory location 29. When the scoreboard is empty, access is permitted for WRITE, but not for READ. When the scoreboard is reserved, access is not permitted for WRITE or READ. When the scoreboard is full, access is permitted for READ, but not for WRITE. The reserve state is set in the scoreboard while the operand and result are traversing the data loop and processor. Similar scoreboarding is applied to data memory when a processor(s) contains several processes communicating through a common memory. Then only two states (empty, full) are required, because the SFU 45 puts the requesting process in a dormant state.

Figure 10:
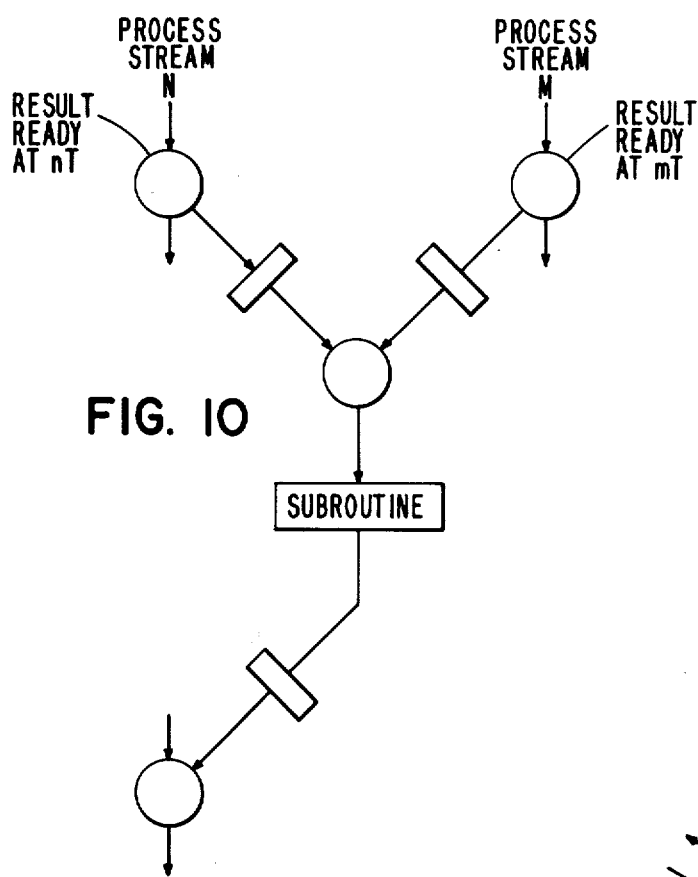
FIG. 10 is a flow chart illustrating use of create to avoid overhead due to process latentcy.

When program instruction requires the use of asynchronous variables, the control checks for scoreboard permission to grant the instruction. If permission is not given, the instruction is waved-off and tried again later (the next time it comes up in the snapshot). It is easy to see that sometimes excessive delays can be caused before the execution of a routine due to lack of scoreboard permission. An example of this is shown in FIG. 10. If N or M is large, then the process status word associated with a subroutine SUBR will reside in the queue and generate overhead due to its inactivity until both process stream N and process stream M have generated the required data input for SUBR. To avoid difficulty, stream M executes CREATE instruction to start SUBR. If it cannot be determined whether stream M or stream N has the greatest latency, either can be used to execute the CREATE instruction because scoreboarding input locations provides automatic protection. The last instruction in SUBR will be QUIT so that it removes itself from the queue after it has completed its calculation.

As shown in FIGS. 6 and 7, the memory bus control 63 receives scoreboard status, parity and user trap information from unit 64. If the current instruction cannot be executed because of scoreboard, parity or trap conditions, the memory bus control 63 will not issue a function grant to the function unit specified by the op code, thus effectively bypassing the instruction. In the event a trap occurs or a parity error is detected, the CFU will wave-off instructions generated due to PSWs already in the instruction loop (instruction pipeline). The CFU also uses the wave-off mechanism to prevent synchronous or asynchronous bus transactions for empty instruction pipeline states (phantoms).

There are synchronous and asynchronous function units. Notice that the processor has a provision for the inclusion of additional function units 65. Results generated by synchronous function units are written in the destination location (usually register memory) by the time the PSW generating the instruction is relinked. Input and output data transactions for the synchronous function units are carried out with the synchronous function units input and output buses. Inasmuch as synchronous function units are pipelined to the same depth, there can be no conflict for the use of the synchronous output bus. The destination address for a result produced by a synchronous function unit (generated by the address calculator 51) is delayed to coincide with the time at which the result is ready. At this time, the result is written in the destination location (of course, the availability of the destination location in register memory has already been established from scoreboard status.) Examples of synchronous function units are the adder (floating-point) 35, multiplier (fixed and floating-point) 37, and integer function unit (IFU) 41 which carries out all other machine instructions except floating-point divide and data memory accessing. For certain types of data memory accessing, the SFU 45 acts as a synchronous function unit.

The time required to generate output data by the various asynchronous function units is not the same and is too long for compatibility with the synchronous cycle. Examples of asynchronous function units are the floating-point divider (FPD) 39 and the SFU 45 for certain types of data memory accessing. The operands for the inputs to the FPD 39 and SFU 45 are passed via the synchronous function unit input bus. The outputs from the FPD and SFU are passed to the destination location via the asynchronous function unit output bus. Conflicts for the use of the asynchronous output bus are resolved with the asynchronous destination address snapshot 69. In case an asynchronous function unit pipe is full and the unit is waiting for service by the snapshot, further instructions which require its use will be waved-off.

A PSW which generates an asynchronous instruction, say a floating-point divide, is prevented from generating the next sequential instruction by scoreboard status. That is, for an instruction which uses the result of the divide operation, the scoreboard status of the destination location for the divide result is checked and the instruction will not be executed (waved-off). Presumably, the instruction will be executed the next time it is attempted.

When a process generates an asynchronous data memory access, the PSW is made dormant (inactive). When the asynchronous access is complete, the PSW is relinked (reactivated).

Data memory modules are categorized as local (to a processor) or non-local. Each data memory location is scoreboarded in the sense that it has an empty-full semaphore. If a memory access is local and ignores the scoreboard status, it is considered synchronous, otherwise, it is asynchronous. The time required for a synchronous access is compatible with synchronous instruction execution. Results from an asynchronous read of data memory are written in the destination location (register or constant memory) via the asynchronous bus under the control of the asynchronous destination address snapshot 69. When an instruction requires the use of the SFU, both the PSW generating the instruction and its TSW are passed to the SFU, so that the address of the memory access can be generated and so that the SFU can determine whether or not the access is local. Out-of-range addresses will cause a trap to occur by passing pertinent information to the CFU from the SFU.

The register and constant memories are accessed in each of four minor machine cycles. The four minor cycles comprise one machine cycle. The minor cycle accesses are:

read first operand; write synchronous;

read second operand; and read/write asynchronous. If block transfer control is included in the SFU 45, data can be removed back and forth between register (or constant) memory and data memory during the read/write asynchronous minor cycle. This data transfer can be carried out without interference to synchronous instruction execution which uses the three other minor cycles.

Program memory accesses occur during each of two minor cycles (comprising one machine cycle) permitting simultaneous accessing for instructions (generated by PSWs) and the hardware access control. Similarly, the data memory is accessed during two minor cycles permitting simultaneous synchronous and asynchronous accessing.

The scheduler function unit (SFU) 45 supports six basic operations. There are three distinct ways in which operands can be addressed in data memory. For the load (LOD) and store (STO) instruction, the address is contained in the instruction itself. In the load indirect (LDI) and store indirect (STI) instruction, the address if obtained from a register specified by the instruction. For load indexed (LDX) and store indexed (STX) instructions, the address is obtained by adding the contents of two registers specified in the instruction. For these instructions the destination specifies where the data are to be placed in the case of a load and one of the sources specifies where the data is to be taken from in the case of a store.

The operation field of each instruction includes four bits which specify how the data memory location is to be scoreboarded. Two bits indicate how it is to be scoreboarded if it is used as a source and the other two specify how it is to be scoreboarded if it is used as a destination. Although it is manifest from the operation (load or store) whether the data memory location is to be used as a source or a destination, the four bit scoreboard field specifying both kinds of scoreboarding is included for compatibility with the fact that the scoreboarding information may be associated with the data memory address and, thus, be contained in a register. A fifth bit in the operation field specifies whether the scoreboarding is obtained from the instruction or from a register.

One bit of the operation field together with 3 bits of the address determine how the data memory location is to be accessed, i.e., as a full 64 bit word, as a half word and if so which half word, as a quarter word and if so which quarter word, or as a byte and if so which byte, as is brought out more fully hereinafter. Another bit in the operation field determines whether the scoreboard testing and modification specified is to be done or whether the scoreboard status of the destination (data memory location or register) is to be copied directly from the source without modification. This feature is useful in saving and restoring process states.

The address space of the SFU encompasses a total of $2^{32}$ bytes, i.e., $2^{29}$ 64 bit words. The way word and fractional word addressing is specified as shown in Table II.

TABLE II

WORD AND FRACTIONAL WORD ADDRESSING

| OPERATION FIELD BIT | LOW THREE ADDRESS BITS | PORTION OF THE WORD THAT IS ADDRESSED | | |
|---|---|---|---|---|
| 0 | 000 | WORD | (BITS | 0–63) |
| 0 | 001 | QUARTERWORD | (BITS | 0–15) |
| 0 | 010 | HALFWORD | (BITS | 0–31) |
| 0 | 011 | QUARTERWORD | (BITS | 16–31) |
| 0 | 100 | WORD | (BITS | 0–63) |
| 0 | 101 | QUARTERWORD | (BITS | 32–47) |
| 0 | 110 | HALFWORD | (BITS | 32–63) |
| 0 | 111 | QUARTERWORD | (BITS | 48–63) |
| 1 | 000 | BYTE | (BITS | 0–7) |
| 1 | 001 | BYTE | (BITS | 8–15) |
| 1 | 010 | BYTE | (BITS | 16–23) |
| 1 | 011 | BYTE | (BITS | 24–31) |
| 1 | 100 | BYTE | (BITS | 32–39) |
| 1 | 101 | BYTE | (BITS | 40–47) |
| 1 | 110 | BYTE | (BITS | 48–55) |
| 1 | 111 | BYTE | (BITS | 56–63) |

It should be noted that an operation field bit determines whether the addressing is byte addressing or addressing of some larger quantum of memory, and the low 3 address bits specify the part and location of the word or fractional word being addressed. Addresses greater than $80000000_{16}$ are special locations which are used to address I/O devices and other memories of the processor. The interpretation of these addresses is shown in Table III.

TABLE III

ADDRESSES

| ADDRESS DERIVED FROM INSTRUCTION | OBJECT ADDRESSED |
|---|---|
| 00000000 to 7FFFFFFF | DATA MEMORY, BASED |
| E0000000 to DFFFFFFF | I/0 DEVICES |
| E0000000 to EFFFFFFF | PROGRAM MEMORY, ABSOLUTE |
| F0000000 to FFFFFFFF | (ILLEGAL) |

If the address specified by the instruction is less than $80000000_{16}$, the data memory base register contents is added to the address specified by the instruction. Once this has been done, the effective data memory address is checked to see whether it lies within local memory space. If it does, the local memory is accessed by the SFU, otherwise the request is sent to the switch. In the event a scoreboarded access is requested or a store indexed instruction is to be executed, the memory request is sent to the switch even if it lies within local memory space.

Figure 11:
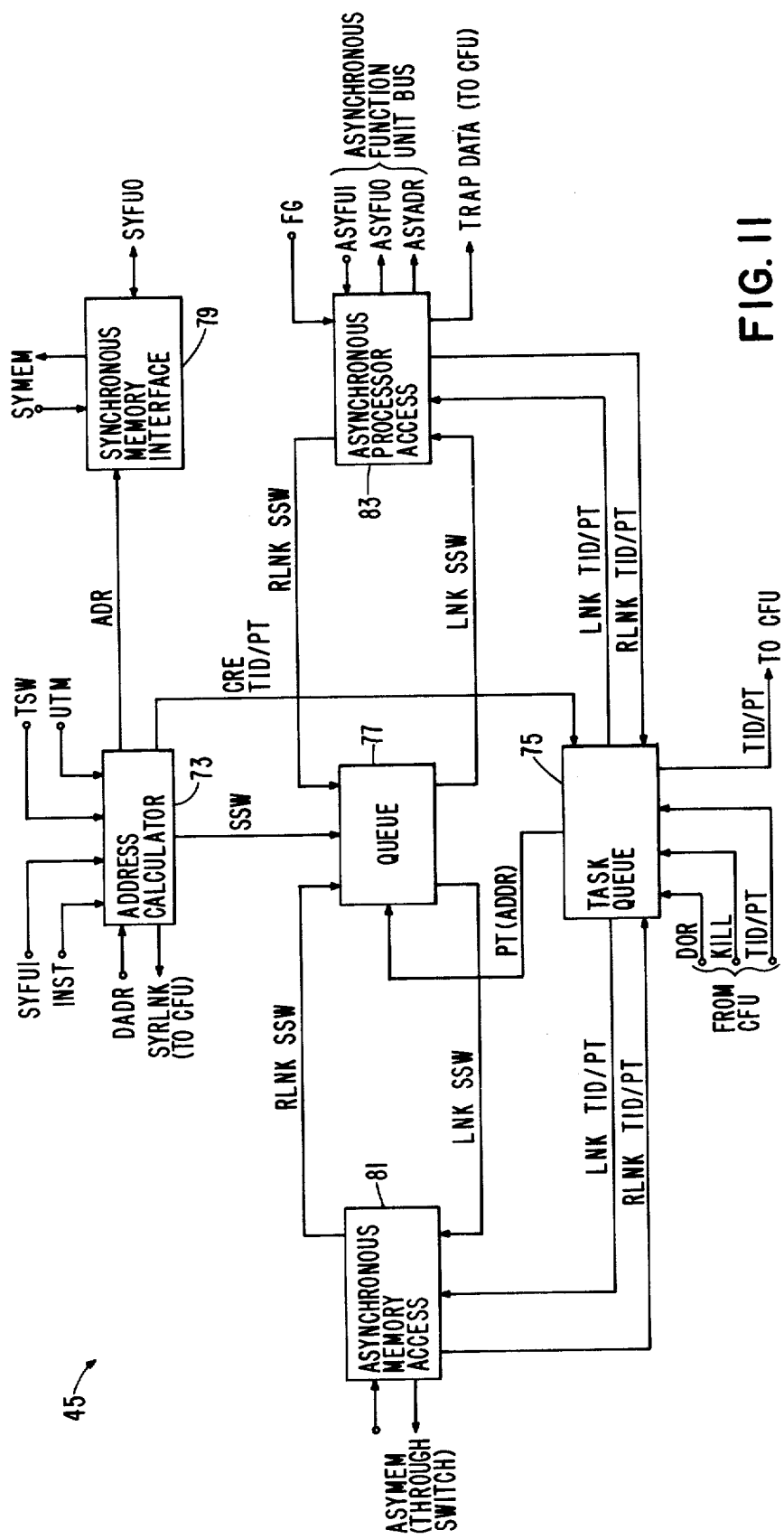
FIG. 11 is a block diagram showing the scheduler function unit used in this invention.

The SFU 45 is shown in block form in FIG. 11. It consists of an address calculator 73 a task queue 75, a queue 77, a controller and interfaces to synchronous memory 79, and asynchronous memory and processor access 81 and 83, which is a part of an asynchronous function unit bus and switch unit. The legends used on this FIGURE are set forth in Table IV hereinafter.

TABLE IV

| LABEL | DEFINITION |
|---|---|
| ADR | Address |
| ASY | Asynchronous |
| CFU | Create Function Unit |
| CRE | Create |
| D | Destination |
| DOR | Dormant |
| FG | Function Grant |
| FUI | Function Unit Input Bus |
| FUO | Function Unit Output Bus |
| INST | Instruction |
| LNK | Link |
| MEM | Memory |
| PT | PSW Pointer |
| RLNK | Relink |
| SSW | Scheduler Status Word |
| SY | Synchronous |
| TID | Task Number |
| TSW | Task Status Word |
| UTM | User Trap Mask |

The queues serve to hold the 128 bit SFU state which contains the memory address in data memory which is being accessed, the data which are being stored or read, the register address involved, the scoreboard control to be applied to the data memory location, cycle code telling the SFU control which state of execution the SFU instruction is in, and a field which is for either the user trap mask (UTM) or the trap code which occurs (in address computation or due to trappable data quality). The task queue holds the process tag (PT) and the task identifier (TID) for those processes which are currently executing SFU instructions.

Access to the queue is divided into four cycles. Three of these cycles are write cycles and they are used to write the SFU state from the address calculation, the asynchronous function unit bus, and the switch. The fourth cycle is a read cycle in which the task queue is accessed to obtain a PT which is then used to address the queue. The read operation initiates actions of the SFU; the write cycles are only used to store the information resulting from an action back into the queue in preparation for another read cycle.

When an instruction is issued, a state describing the operation is written into the queue and the PT is inserted into the task queue system. Ultimately, this PT is read from the task queue and used to address the queue. The queue is read and the cycle code part of the state is used to determine whether the request is to go to the asynchronous function unit bus or to the switch. The state information is sent to the appropriate interface and starts a transaction there. Upon completion of the transaction (that is, after completion of the request on the asynchronous function unit bus or after the traversal of the request through the switch to data memory and back), the state will be rewritten into the queue in preparation for the next cycle of the instruction. Except for traps, no instruction requires more than two cycles through the task queue.

Local memory accesses do not enter the queue at all. A local memory access must meet synchronous timing constraints and cannot incur the delay implied by entry into the task queue system. Instead, unscoreboarded local memory accesses resulting from instructions other than STOX will actually go directly from address calculation to the local memory interface. All other instructions take 1 or 2 cycles through the task queue to be executed. In general, STO and STOI take 1 cycle and all other instructions take 2 cycles. The control of the SFU distributes PT's and TID's to the asynchronous function unit interface, to the switch interface, and to the create function unit to signal a trap. In addition, when an instruction is completed, the PT and TID are sent to the central processor queue-task queue system to allow the relinking of that process. When an instruction is issued, the process issuing the instruction is removed from the control queue; thus it must be reinserted to allow that process to proceed. Traps that can be generated by the SFU include traps due to data memory protection violation, privileged instruction violation, and user traps. The trap code is sent to the create function unit along with the PT and TID of the process to be trapped. The asynchronous function unit interface actually sends the trap data to the CFU, and the TID and PT are sent from the task queue system.

The scheduler function unit functional diagram shows that the address calculator accepts the data address (DADR), the instruction OP code, the data to be stored (if any), the TSW, and the user trap mask. The address calculator decodes the address and decides whether the address is local. If it is not, then an SFU state (SSW) is created and sent to the queue. The task queue issues a PT to the queue; the PT is used to fetch a state out of the queue, and this state is sent to the asynchronous function unit interface or to the switch. Each of these can in turn write a new SSW into the queue. Notice that it is also necessary to send the TID and PT to the asynchronous function unit interface and to the switch interface so that when the operation performed by that interface is totally complete, that TID and PT can be reinserted into the task queue and used to address the queue to store the new SSW into the correct location.

Updating of the SSW is the responsibility of the interfaces and is based on the result of the operation performed by the interface with respect to the facility it communicates with. In the case of the switch, the only interesting state modification performed has to do with success of failure. In the event of success, the state is caused to change to the state required for the next cycle. Similarly, the asynchronous function unit interface has to cause state transitions. Setting of the initial state is the responsibility of the address calculator. The task queue can contain up to 128 processes. The reason that so many processes have to be provided for in the task queue is to prevent deadlock in the event a process which can free other precesses is not allowed to access data memory to do so.

When the task queue reads a PT corresponding to a task being killed, then that TID-PT pair is relinked (sent back to the central queue) whether the operation has been completed or not. Also, whenever a given task is dormant, instructions belonging to that task are not allowed to proceed. After a task has been completely killed, the queue contains states reflecting the cycle in progress for those processes which had currently pending SFU instructions. Facilities are provided whereby the queue can be read or written to save and restore information relating to these cycles in progress for killed tasks. This allows a task to be systematically removed from or inserted in the SFU.

The computing power (and therefore throughput) of the processor of this invention may be increased by adding processors, memory, and I/O controllers with associated peripherals. Because of the unique parallel organization of the processor system of this invention, its throughput is increased by simply adding a component to the existing system. In this way, it does not become obsolete in several years.

Figure 12:
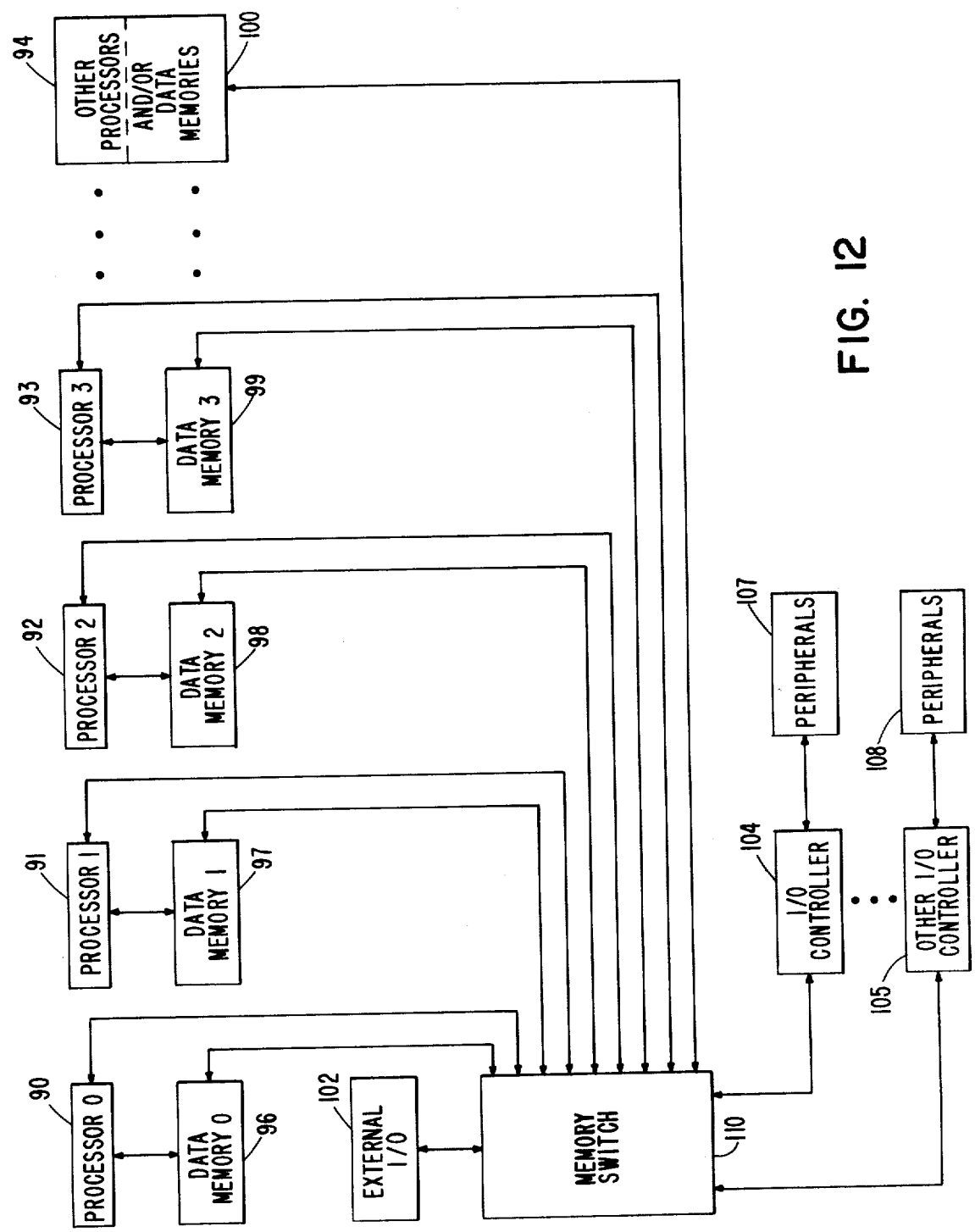
FIG. 12 is a block diagram illustrating an expanded processing system that might be utilized in this invention.

FIG. 12 shows how the porcessor of this invention may be expanded. A multi-processor system including processors 90-94 communicates with data memories 96-100, and also with external I/O unit 102 and/or external I/O controllers 104 and 105 (connected with peripherals 107 and 108) through a memory switch 110. The number of processors which are connected to the switch is independent of the number of the data memories or other devices that are also connected to it. The practical limitation is the time required for data to go through the switch from source to destination.

There is a direct data path between the processor and its associated memory as shown in FIG. 12. This path is used for non-scoreboarded accesses. The data path between a processor and memory other than its associated memory is through the memory switch. This path is used for both scoreboarded and non-scoreboarded accesses. This path through the switch is also used by processor for scoreboarded accesses to its associated memory. The direct path to a memory and a path through the memory switch, access the memory or a separate cycle basis. The access time via the direct path is comparable with the data loop in the processor. Although it is not shown in FIG. 12, there may be provisions for both innerprocessor create instructions and I/O controller interrupt handling.

At one extreme, all of the processors in the processor can be made to execute a single task (for example, the solution of several coupled partial differential equations over a very large number of nodes). At the other extreme, each processor in a multiprocessor system can be executing in a combination of batch, time-share, and real-time simulation process streams. The assignment of work to the processors is simplified with this invention.

Figure 13:
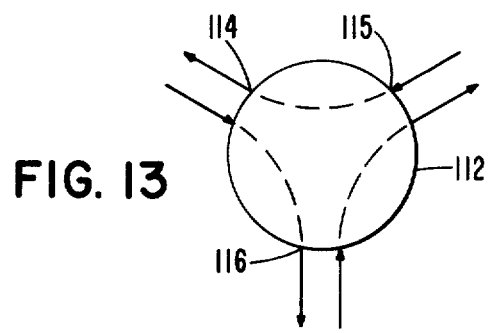
FIG. 13 illustrates the memory switch utilized in this invention.
Figure 14:
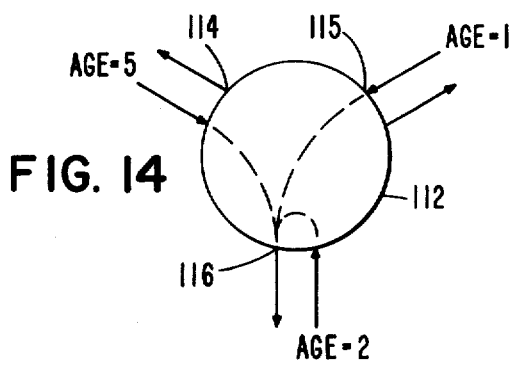
FIG. 14 illustrates desired routing of data in the memory switch as shown in FIG. 13.
Figure 15:
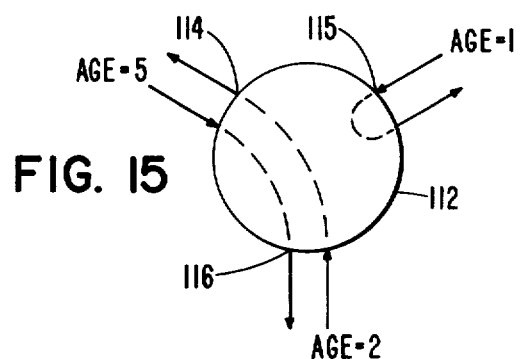
FIG. 15 shows actual routing of data through the memory switch as shown in FIG. 13.

Data are passed between processors and memories other than their associated (or local) memories, through memory switch 110. The switch is modular and is a composed network containing a plurality of "nodes" 112 as shown generally in FIG. 13. Each node simultaneously sends messages to, and receives messages from, a like plurality of neighbors in the network. Each message is a packet containing data, source address, destination address, message age, scoreboard information, and other desired data. Each node has several input/output ports 114, 115, and 116, as shown in FIGS. 13-15. Each node normally routes all incoming messages (from the input ports) immediately to the output ports as indicated in FIG. 13. Each time a message is transmitted through a node, its age is incremented by one. Each node knows which of its output ports should be selected for an incoming message based on the destination address contained in the message. If two or more messages would normally be routed to the same output port, all but the oldest will be routed incorrectly as indicated in FIGS. 14 and 15 (where the messages are shown with different ages for illustration). It can be shown mathematically that each message will eventually arrive at its destination. In practice, a few misroutings of a message will guarantee its subsequent arrival at its destination without further delay.

Thus, the memory switch automatically distributes messages and resolves conflicts if several messages are routed to the same module. The switch features a flexible network topology, a pipelined message throughput rate of 100 ns per message per port, and a message propogation rate of 50 ns for each switch node encountered. Each of the nodes of the switch can simultaneously send messages to, and receive messages from, each neighbor in the network. The node may be a 3×3 data switch, as indicated in FIG. 13.

Unlike nodes in many packet switching networks, the nodes of this switch do not enqueue messages when correct message forwarding is impossible due to a routing conflict. Instead, each incoming message is routed immediately to an output port. If two or more messages need to be routed to the same output, as shown in FIG. 14, all but one of them will be routed incorrectly as shown in FIG. 15.

It is the responsibility of the neighbors of the node, and in general the entire switch, to ensure every message eventually reaches its correct destination. Each node is programmed to know the best output port through which the message can be routed to reach its particular final destination.

When an SFU accesses a data memory location, a message is generated by the SFU containing the operation, the destination (memory) address, the data (if it is a write operation), and the source module address. The age of the message is set to zero. This message is inserted in the switch and makes its way to the memory. When the message reaches the memory, the access is attempted and a new message is generated consisting of the operation, the destination (module) address, the data, (if a READ operation was performed), and the source (memory) address. The operation part of the message indicates whether the operation was successful or was not performed due to scoreboard constraints. This message is inserted in the switch and eventually returns to the SFU where appropriate action is to be taken. It is important to note that the message format is independent of the direction of communications; it is only the destination address that determines the routing of the message at each node.

The flexible topology of the switch allows it to be configured differently allowing for different memory access statistics. Behavior of various alternative topologies under different conditions is simulated with a computer program to select the best topology for an application.

To make sure messages do not spend an inordinate amount of time in the switch because of routing conflicts, each message has an "age" counter which is incremented by one each time the message passes through a node. If two or more messages at a node request the same output port, the message with the greater age will be routed there. In case all contenders are the same age, the node chooses arbitrarily the message to be routed through the port. This procedure guarantees that each message eventually leaves the switch because the number of messages of maximal age in switch in any moment is guaranteed to decrease by at least one every 50 L ns, where L is the maximum number of nodes on any path on a switch. In practice, a message need only be misdirected a few times to acquire an age which will guarantee its subsequent correct routing.

A module attached to the periphery of the switch occassionally will receive incorrectly routed messages. When this occurs, the module immediately reinserts the misrouted message back to the switch. This strategy prevents the switch from becoming saturated, because when a module is reinserting a misdirected message, it cannot insert a new message of its own. In this way, a high conflict rate within the switch will cause an effective lowering of its input rate.

Thus, as can be seen from the foregoing, this invention provides a novel processor and method wherein concurrent tasks and instruction processing is enabled, wherein access regulation is provided, and wherein protection and relocation are afforded.

What is claimed is:

1. A concurrent task and instruction processing device, comprising:

task processing means including control pipeline means and sequencing means connected with said control pipeline means to control the input thereto for sequentially processing tasks by components thereof through said control pipeline means, said sequencing means including memory means and component selection means connected with said memory means to cause selected components to be withdrawn from said memory means and sequenced through said control pipeline means, said memory means including at least one of a task status word memory and a process status word memory, and said component selection means including indicator storage means and selector means connected with said indicator storage means for selecting indicators and coupling the same to said at least one of said task status word memory and said process status word memory for causing an output therefrom to said control pipeline means, whereby said control pipeline means provides multiple sequential output instructions determined by said task components processed therethrough; and data processing means including data storage means and function execution means, said data processing means being controlled by said output instructions from said task processing means so that said function execution means, responsive to said output instructions, causes data in said data storage means to be withdrawn therefrom and acted upon by said function execution means concurrently with task component processing through said control pipeline means.

2. The processing device of claim 1 wherein said control pipeline means includes memory means for providing instructions and addresses as needed.

3. The processing device of claim 2 wherein said memory means includes at least one address calculator.

4. The processing device of claim 1 wherein said memory means includes both a task status word memory and a process status word memory, wherein said indicator storage means is a task component indicator storage means, and wherein said selector means is connected with said task component indicator storage means for selecting indicators and coupling the same to said task status word memory and said process status word memory for causing outputs therefrom to said control pipeline means.

5. The processing device of claim 1 wherein said task component indicator storage means includes a plurality of task first-in, first-out buffers having process data word pointers therein, and wherein said selection means includes snapshot circuitry connected to said task first-in, first-out buffers.

6. The processing device of claim 1 wherein said data storage means includes a register memory and a constant memory.

7. The processing device of claim 1 wherein said function execution means includes a plurality of function units.

8. The processing device of claim 7 wherein said function units include a create function unit, an integer function unit, a scheduler function unit, an add/subtract function unit, a multiplier function unit, and a divider function unit.

9. The processing device of claim 1 wherein said device includes scoreboarding means connected with said data processing means and said task processing means for regulating access to said data storage means so that data can be written into and read out of said data storage unit only at preselected states of said data storage means.

10. A concurrent task and instruction processing device, comprising:
a plurality of task first-in first-out buffers each of which is adapted to receive process data word pointers for storage therein;
snapshot circuitry connected with task first-in, first-out buffers to sequentially withdraw said pointers therefrom and provide indications thereof;
a process status word memory connected with said snapshot circuitry to receive said pointers therefrom and responsive thereto coupling process status words from said process status memory;
a task status word memory connected with said snapshot circuitry to receive said indications therefrom and responsive thereto coupling task status words associated with said process status word from said task status word memory;
a control pipeline for receiving said process status words and said task status words from said process status word memory and said status word memory and processing the same through said control pipeline, said control pipeline responsive to said received process status words and said task status words providing sequential instruction outputs;
memory means for storing data to be processed;
a plurality of function units connected with said memory means; and
coupling means for coupling said instruction outputs from said control pipeline to said memory means and said plurality of function units for controlling withdrawal of data from said memory means and causing the same to be processed by said function units concurrently with processing of said tasks.

11. The processing device of claim 10 wherein said task first-in, first-out buffers includes process status word pointers for several tasks and can also include different parts of the same task.

12. The processing device of claim 10 wherein said snapshot circuitry includes means for sequentially selecting a pointer from each of said task first-in, first-out buffers on a round-robin basis until all of with said pointers in said snapshot are selected.

13. The processing device of claim 10 wherein said device includes a create function unit for causing relinking of said pointers into said task first-in, first-out buffers after said process status and task status words are processed through said control pipeline.

14. The processing device of claim 13 wherein the time required for relinking a said pointer is the same as the time required for executing instructions whereby said device operates synchronously.

15. The processing device of claim 13 wherein the time required for relinking a said pointer is different from the time required for executing instructions whereby said device operates asynchronously.

16. The processing device of claim 10 wherein said memory means includes a register memory and a constant memory.

17. The processing device of claim 16 wherein said device includes scoreboard means connected with said register memory for regulating access to said register memory whereby said register memory can be accessed only when in certain preselected states.

18. The processing device of claim 17 wherein said scoreboard means regulates access so that READ access is provided only when said register means is full and WRITE access is permitted only when said register means is empty.

19. An instruction processing device, comprising:
at least one first-in, first-out buffer adapted to receive process data word pointers for storage therein;
snapshot circuitry connected with said first-in, first-out buffer to sequentially draw said pointers therefrom and provide indications thereof;
a process status word memory connected with said snapshot circuitry to receive said pointers therefrom and responsive thereto coupling process status words from said process status memory;
a control pipeline receiving said process status words from said process status word memory and processing the same through said control pipeline, said control pipeline responsive to said received process status words providing sequential instruction outputs;
memory means for storing data to be processed;
at least one function unit connected with said memory means; and
coupling means for coupling said instruction outputs from said control pipeline to said memory means and said function unit for controlling withdrawal of data from said memory means and causing the same to be processed by said function unit.

20. The processing device of claim 19 wherein said memory means includes a register memory and a constant memory.

21. The processing device of claim 20 wherein said device includes scoreboard means connected with said register memory for regulating access to said register memory whereby said register memory can be accessed only when in certain preselected states.

22. The processing device of claim 21 wherein said scoreboard means regulates access so that READ access is provided only when said register means is full and WRITE access is permitted only when said register means is empty.

23. A concurrent task and instruction processing device, comprising:
a plurality of task first-in, first-oout buffers each of which is adapted to receive process status word pointers for storage therein;
snapshot control circuitry connected with said plurality of first-in, first-out buffers for causing a snapshot to be made of the next pointer to be withdrawn from each of said task first-in, first-out buffers having pointers therein;
pointer selection means connected with said plurality of task first-in, first-out buffers and said snapshot control circuitry for sequentially selecting each pointer in said task snapshot and coupling the same from said buffers;

a process status word memory connected with said pointer selection means for providing process status word outputs therefrom is response to receipt of a said pointer from said pointer selection means;

a task status word memory connected with said snapshot control circuitry for providing a task status word output associated with said process status word output coupled from said process status word memory;

a memory address calculator connected with said process status word memory and said task status word memory to receive said outputs therefrom;

an address calculator connected with said task status word memory;

a decoder providing an output;

a program memory connected with said memory address calculator and providing an output to said address calculator and said decoder;

data memory means including a register memory and a constant memory connected with said program memory; and function units connected with said data memory means and said decoder for executing instruction with respect to data withdrawn from said memory means.

24. The processing device of claim 23 wherein said decoder is an op code decoder connected between said program memory and said function units.

25. The processing device of claim 23 wherein said function units include a scheduler function unit connected with said task status word memory and said process status word memory, and a create function unit connected with said task first-in, first-out buffers.

26. The processing device of claim 25 wherein said device includes an out-of-range address detector connected with said task status word memory and said calculators, said out-of-range detector providing an output to said create function unit.

27. The processing device of claim 26 wherein said device includes a scoreboard, user trap, and parity function unit connected with said create function unit, and an asynchronous distribution address snapshot unit connected with said scheduler function unit for interprocess data transfers.

28. The processing device of claim 27 wherein said register memory of said data memory means includes scoreboard means for regulating access to said register memory.

29. A process for concurrently processing task and instructions, said process comprising:
providing task components to be processed;
providing indicators of said task components, said indicators of said task components being status word pointers;
storing said pointers in buffers;
sequentially processing said task components including withdrawing said indicators from said storage and utilizing said withdrawn indicators to concurrently generate multiple instructions for data processing by passing said components through a control pipeline to generate said multiple instructions;
providing at least one function unit for acting upon data to be processed; and
executing said instructions concurrently with processing of said task components to thereby cause said function unit to act upon said data to process the same.

30. The process of claim 29 wherein said indicators of said task components are process status word pointers, and wherein said pointers are stored in task first-in, first-out buffers.

31. The process of claim 29 wherein said sequential processing of said task components includes taking a snapshot of the pointers in said buffers next to be processed, and wherein said sequential withdrawal of said indicators includes sequentially selecting said pointers in said snapshot.

32. The process of claim 30 wherein said process includes relinking of said process status word pointers in said first-in, first-out buffers after said task components have been passed through said control pipeline.

33. The process of claim 29 wherein passing of said task components through said control pipeline causes generation of addresses for instruction execution by said function unit.

34. The process of claim 29 wherein providing of said task components includes providing task status words and process status words, and wherein processing of said task components includes storing of said task status words and said process status words in a task status word memory and a process status word memory, respectively, for withdrawal therefrom for generation of said multiple instructions.

35. The process of claim 29 wherein said processing of said task components is synchronous with said instruction execution.

36. The process of claim 29 wherein said processing of said task components is asynchronous with respect to instruction execution but precedence restraint penalties are avoided.

37. The process of claim 29 wherein said process includes storing said data in memory units and withdrawing said data therefrom for acting upon by said function units, and wherein said process also includes checking the status of said memory units prior to execution of said instructions with said execution being delayed unless said memory unit then involved is in a predetermined state.

38. The process of claim 37 wherein said process includes delaying execution of said instructions unless said memory unit is full when data is to be read from said memory unit, and unless said memory unit is empty when data is to be written into said memory unit.

39. A method for generating and processing of instructions, said method comprising:
providing process components;
providing indicators of said process components, said indicators being status word pointers;
providing process component indicator storage including storing said pointers in at least one buffer;
sequentially processing said process components to generate multiple instructions for data processing by sequentially withdrawing said indicators from said storage and utilizing said withdrawn indicators to cause said sequential processing of said process components by passing said components through a control pipeline to generate said multiple instructions;
providing at least one function unit for acting upon data to be processed; and
executing said instructions concurrently with processing of said process components to thereby cause said function unit to act upon said data to process the same.

40. The process of claim 39 wherein said indicators of said process components are process status word pointers, and wherein said pointers are stored in at least one task first-in, first-out buffer.

41. The process of claim 39 wherein said sequential processing of said process components includes taking a snapshot of the pointers in said buffer next to be processed, and wherein said sequential withdrawal of said indicators includes sequentially selecting said pointers in said snapshot.

42. The process of claim 40 wherein said process includes relinking of said process status word pointers in said first-in, first-out buffer after said process components have been passed through said control pipeline.

43. The process of claim 39 wherein passing of said process components through said control pipeline causes generation of addresses for instruction execution by said function unit.

44. A process for concurrently processing task and instructions, said process comprising:
- storing process status word pointers in buffers;
- storing process status words and task status words in word memories;
- withdrawing said pointers in sequence from said buffers and utilizing the same to cause withdrawal of process status words and an associated task status word from said word memories;
- passing said process status words and associated task status words through a control pipeline to generate multiple instructions;
- storing data in a data storage memory;
- providing a plurality of function units to act upon data; and
- utilizing said instructions to cause data to be withdrawn from said data storage memory and acted upon by said function unit concurrently with processing of said process status words and associated task status word through said control pipeline.

45. The process of claim 44 wherein said storing of said pointers includes storing said pointers in a plurality of first-in, first-out buffers, and wherein withdrawing said pointers includes periodically taking a snapshot of the next pointer in each buffer to be withdrawn therefrom, with each pointer in said snapshot being sequentially withdrawn from said buffer before the next snapshot is taken.

46. The process of claim 44 wherein said process includes checking of said data storage memory to assure that said memory is in a predetermined state prior to execution of an instruction.

* * * * *